May 31, 1949.　　　　O. H. SCHAAF　　　　2,471,548
ZIG-ZAG FILTER CONSTRUCTION
Original Filed Feb. 1, 1943
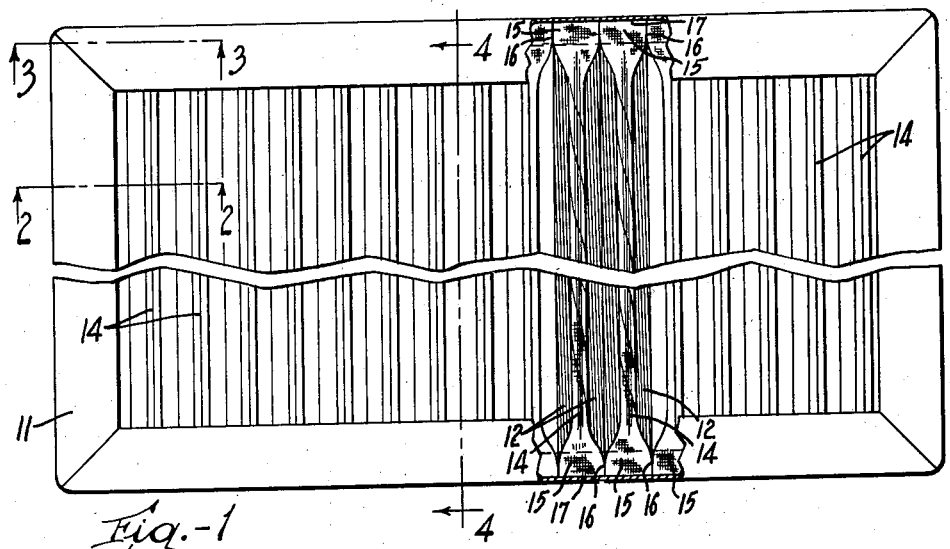
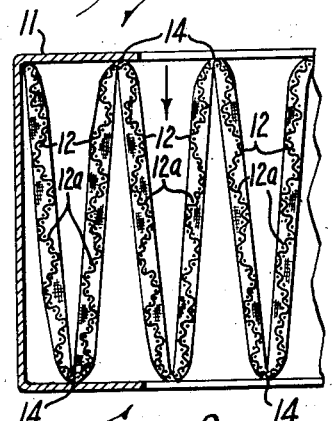
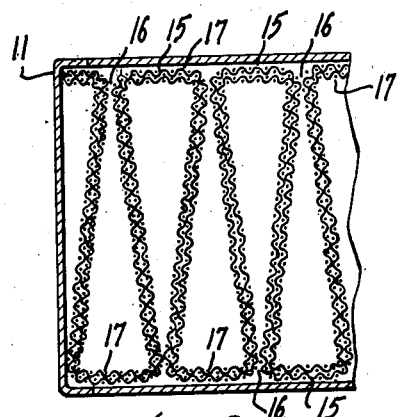
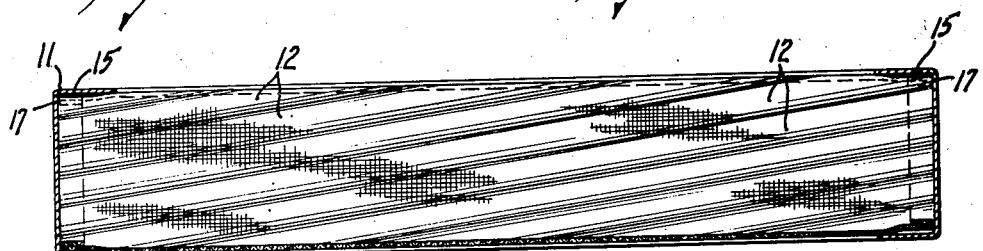
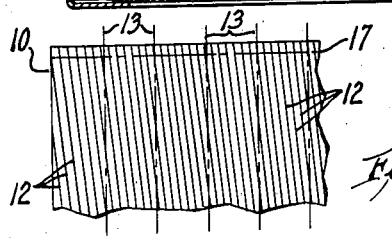
INVENTOR.
OLIVER H. SCHAAF
BY Hyde and Meyer
ATTORNEYS.

Patented May 31, 1949

2,471,548

UNITED STATES PATENT OFFICE 2,471,548

ZIGZAG FILTER CONSTRUCTION

Oliver H. Schaaf, Chagrin Falls, Ohio, assignor to Air-Maze Corporation, Cleveland, Ohio, a corporation of Delaware Original application February 1, 1943, Serial No. 474,311. Divided and this application December 14, 1945, Serial No. 634,996

4 Claims. (Cl. 183—71)

This invention relates to improvements in fluid treating units for screening small particles from fluid streams, one of the commoner uses of the unit being that of an air filter.

This application is a division of my copending application, Serial Number 474,311, filed February 1, 1943, which has become Patent No. 2,398,045, dated April 9, 1946.

Among the objects of the present invention is the provision of a novel structure of an air filter which is cheap to construct and yet efficient in operation. It will be understood by those skilled in this art that filters such as this are sometimes used in airplanes where weight and efficiency are the two major factors involved. An object of the present invention therefore is to provide a very efficient filter utilizing material of very light weight.

Other objects and advantages of the present invention will appear from the accompanying drawings and description and the essential features thereof will be set forth in the appended claims.

In the drawings Fig. 1 is an elevational view of a simple form of filter constructed according to my invention; Figs. 2 and 3 are enlarged fragmental sectional views taken along the lines 2—2 and 3—3 respectively of Fig. 1; Fig. 4 is a transverse sectional view taken along the line 4—4 of Fig. 1; while Fig. 5 is a fragmental view illustrating somewhat diagrammatically how a sheet of screen material is processed to produce the filter of Figs. 1 to 4.

It should be understood at the outset that wherever I have referred to a sheet of screen material, I refer to any material adapted to filter small particles from a stream of air or other fluid passing through the unit whether the same be common woven wire mesh or some other material of equivalent function. For instance, the unit here described might be formed from the cloth covered screen disclosed in the copending United States application of Clarence J. Glanzer, Serial No. 529,925, filed April 7, 1944. But other materials are equally useful for carrying out my invention.

In general the unit here disclosed comprises a sheet 10 of self-supporting screen material capable of holding any form to which it is bent, the specific form here disclosed being intended to represent woven metallic screen. This sheet is bent to provide a series of zig-zag folds having parallel ridges and troughs facing alternately in opposite directions. This folded material is suitably held in some sort of frame means, such as that indicated at 11, which prevents unfolding of the zig-zag folds by exerting a confining force at right angles to the ridges—for instance, at the right and left hand edges as viewed in Fig. 1. At the same time, the frame means closes the normally open ends of the zig-zag folds at the top and bottom of Fig. 1 so as to prevent any leakage of unfiltered fluid at these points. It will be understood that the fluid to be filtered passes through the unit through the open front and rear of the frame means 11, depositing the particles filtered out on the screen material and within the zig-zag folds. If the minimum weight of screen is to be used, the ridges of the folded material running from top to bottom as viewed in Fig. 1, if plain and uncorrugated, will be insufficiently rigid to hold the zig-zag folds properly spaced. In other words, in some places the ridges, instead of remaining equally spaced in parallel relation, will sag against each other, preventing the proper entrance of air at such a point. One of the objects of the present invention, therefore, is to so stiffen this light screen material that it will maintain a substantially uniform parallel relationship between the ridges of the zig-zag folds as illustrated in Fig. 1.

Referring now to Fig. 5, the manner of doing this is illustrated on the portion of sheet 10 there shown. The flat sheet of screen material 10 is first run through a crimping or corrugating machine which crimps the entire sheet in the parallel corrugations shown at 12. In one form of the device, these corrugations 12 are $\frac{1}{16}$ inch to $\frac{3}{32}$ inch deep and approximately ¼ inch apart. Preferably the marginal edge of the sheet is folded back upon itself along the line 17 as shown in Figs. 4 and 5 to give greater stiffness to this edge. The corrugated sheet is then provided with zig-zag folds along the parallel lines indicated at 13 in Fig. 5. This provides the ridges 14 best seen in Figs. 1 and 2 facing alternately in opposite directions. Referring to Figs. 1 and 4, it will be noted that the corrugations 12 extend at an angle to the ridges 14 and thus exert quite a remarkable strengthening effect upon the zig-zag folds. In the broken away portion of Fig. 1, I have attempted to illustrate how these corrugations extend at a gradual incline up one side of the zig-zag fold, then across the ridge and down along the other side of the ridge.

I have provided novel and very inexpensive means for insuring a proper spacing of the zig-zag folds within the frame means. For this purpose the sheet material at the ends of the ridges has been spread laterally as illustrated at 15 in Figs. 1 and 3. When the unit is assembled the frame means 11 squeezes the zig-zag folds together until the laterally spread end portions of the ridges mutually engage each other as indicated at 16. The spreading of the end portions of the ridges is done uniformly by means of a tool so that when the unit is assembled as indicated in Figs. 1 and 3 the ridges 14 are uniformly spaced.

Referring to Figs. 1 and 2, it will be noted that air or other fluid passing from front to rear of Fig. 1 or in the direction of the arrow of Fig. 2, will enter between a pair of parallel ridges 14 and will strike a number of the corrugations 12 as it travels into the trough of the zig-zag folded arrangement before the fluid succeeds in entirely passing through the screen material. The corrugations 12 therefore provide a turbulence of the fluid at this point and also provide deformations in the nature of shelves which more readily catch small particles carried by the fluid stream. In actual use the upper surfaces of the corrugations as indicated at 12a in Fig. 2 become quite dirty, indicating that this action takes place.

It will now be apparent that the combination of the zig-zag folds rendered more rigid by the corrugations 12 are cheaply and easily held properly spaced by the laterally spread end portions 15. This permits the use of a light weight screen material which by means of the corrugations has the ridges 14 held substantially parallel from end to end of the folds, which in Fig. 1 is from top to bottom of the drawing. This permits the air stream to enter to the deepest point of the trough of the zig-zag fold, thus utilizing the entire area of the screen. At the same time the corrugations 12 provide the turbulence and dirt retaining shelves previously described and add some twenty per cent additional area over that which would be found if uncorrugated material were provided with zig-zag folds of the same dimensions.

What I claim is:

1. A fluid treating unit comprising a sheet of stiff screen material, said sheet having a series of zig-zag folds therein providing parallel ridges facing alternately in opposite directions, the flanks of each ridge diverging from the crest of the ridge, the material of said sheet along said flanks having corrugations extending at an acute angle to the crests of said ridges, and frame means open front and rear holding said folds with said ridges spaced apart so that fluid passing through said unit may pass between said ridges and through said folded screen generally at right angles to a plane passing through the ridges of said folds and said corrugations divert said fluid stream and catch small particles carried thereby.

2. A fluid treating unit comprising a sheet of stiff screen material, said sheet having a series of zig-zag folds therein providing parallel ridges facing alternately in opposite directions, the flanks of each ridge diverging from the crest of the ridge, the material of said sheet along said flanks having corrugations extending at an acute angle to the crests of said ridges, means holding said folds evenly spaced, and frame means open front and rear compelling a fluid stream to pass through said folds and generally at right angles to a plane passing through the ridges of said folds, whereby said corrugations hold said ridges stiff and said corrugations provide turbulence and enlarged screen area for catching small particles in a fluid stream passing through said unit from front to rear.

3. A fluid treating unit comprising a sheet of stiff screen material, said sheet having a series of zig-zag folds therein providing parallel ridges facing alternately in opposite directions, frame means open front and rear holding said folds against unfolding and closing the ends of said folds, the strength of said sheet in uncorrugated form being insufficient to hold said folds rigid over the span measured lengthwise of said ridges, said sheet having relatively shallow corrugations extending at an angle to said ridges, means at the ends of said ridges holding said folds evenly spaced, whereby the rigidity added by said corrugations maintains said folds substantially uniformly spaced throughout their length and said corrugations provide turbulence and enlarged screen area for catching small particles in a fluid stream passing through said unit from front to rear, all with a screen of light weight.

4. A fluid treating unit comprising a sheet of stiff screen material having a uniform series of parallel corrugations covering the entire area thereof, said sheet being folded into a series of zig-zag folds extending at an acute angle to said corrugations, and frame means open front and rear holding said folded material and compelling a stream of fluid to pass through said folds and generally at a right angle to said folds.

OLIVER H. SCHAAF.

REFERENCES CITED

The following references are of record in the file of this patent:

UNITED STATES PATENTS

| Number | Name | Date |
|---|---|---|
| 1,566,088 | Greene | Dec. 15, 1925 |
| 2,002,936 | Davies | May 28, 1935 |
| 2,190,886 | Schaaf et al. | Feb. 20, 1940 |
| 2,198,189 | Vokes | Apr. 23, 1940 |